United States Patent [19]
Collins

[11] 4,299,047
[45] Nov. 10, 1981

[54] COLLAPSIBLE SHRIMP TRAWL

[76] Inventor: Bragelin J. Collins, 507 Bilbo St., Delcambre, La. 70528

[21] Appl. No.: 178,580

[22] Filed: Aug. 15, 1980

[51] Int. Cl.³ .......................................... A01K 73/02
[52] U.S. Cl. ...................................................... 43/9
[58] Field of Search .................................. 43/7, 9, 12; 180/DIG. 1, DIG. 2; 280/35, 42, 656, 646

[56] References Cited

U.S. PATENT DOCUMENTS

| | | | |
|---|---|---|---|
| Re. 10,688 | 2/1886 | Moscopoulos | 43/9 X |
| Re. 25,165 | 5/1962 | Pulsifier | 43/9 X |
| 1,723,236 | 8/1929 | Hansen | 43/9 X |
| 1,959,793 | 5/1934 | Lafredo et al. | 43/9 |
| 2,300,178 | 10/1942 | Ross | 43/9 |
| 2,639,162 | 5/1953 | Schon | 280/42 |
| 2,684,549 | 7/1954 | Olden | 43/9 |
| 2,729,910 | 1/1956 | Fryklund | 43/9 |
| 3,458,947 | 8/1969 | Ross | 43/9 |
| 3,775,891 | 12/1973 | Holt | 43/9 |

FOREIGN PATENT DOCUMENTS

| | | | |
|---|---|---|---|
| 87606 | 7/1896 | Fed. Rep. of Germany | 43/9 |
| 106086 | 4/1965 | Norway | 43/9 |

*Primary Examiner*—James G. Smith
*Attorney, Agent, or Firm*—LeBlanc, Nolan, Shur & Nies

[57] ABSTRACT

A collapsible, wheel supported shrimp trawl of the beam type, the beam being centrally hinged on a vertical axis in a direction towards the trailing trawl net and operable from the towing vessel to fold the beam and collapse the trawl, thereby simplifying the bringing aboard of the trawl and its subsequent storage. The beam includes forwardly mounted stabilizing wings and a towline and bridle arrangement including a central liveline or tripline to effect opening and closing of the hinged beam and thus the entire trawl.

9 Claims, 5 Drawing Figures

COLLAPSIBLE SHRIMP TRAWL

BACKGROUND OF THE INVENTION

This invention concerns shrimp trawls in general and more particularly a beam or frame type shrimp trawl having a transverse, forward beam which is centrally hinged and a towline and bridle arrangement to open and close the trawl from the vessel towing the shrimp trawl.

In commercial shrimp fishing, there are two categories of trawl net structures used, these being beam trawls wherein the mouth of the trawl net is kept open by a transverse beam, and otter trawls wherein the mouth of the trawl is kept open by the force of water against otter boards or doors at each side of the mouth of the trawl as the trawl is towed across the sea floor.

Otter trawls have the particular advantage of being easily stored in a compact area aboard the ship or vessel when the trawl is not in use. However, fishing with an otter trawl can be rather complicated as vessel speed must be matched with otter board configuration and design to assure the trawl remains open during use.

Conversely, the beam trawl is far more easily used, as the transverse beam at the mouth of the trawl keeps it open during towing. The major drawback of beam trawls is that the beam is rather unwieldly to handle on deck; the trawl takes up considerable space when stored. Also, lowering of a beam trawl into water and its removal onto the deck of the vessel after fishing can be a tricky, cumbersome process.

A wheeled beam trawl having a fixed, non-folding central beam is disclosed in U.S. Pat. No. 3,458,947 issued Aug. 5, 1969 to John J. Ross. A similarly structured sponge trawl is disclosed in U.S. Pat No. Re. 10,688 issued Feb. 16, 1886 to Basilios K. Moscopoulos and is provided with detachable end members to facilitate breakdown and storage of the trawl when not in use. A beam trawl having a centrally hinged beam so the trawl may be more easily stowed aboard ship is disclosed in U.S. Pat. No. 3,775,891 issued Dec. 4, 1973 to John K. Holt. However, the beam trawl disclosed therein is folded in the direction of tow rather than towards the trailing trawl and no provision is made to open and close the trawl while it is still in the water. Additionally, this trawl is not wheeled, but instead provided with sled runners, and a relatively bulky framework for defining the forward, open end of the trawl. U.S. Pat. No. 953,069 issued Mar. 29, 1910 to Hiram H. Thompson discloses a somewhat related structure in the form of a fish trawl havng a frame structure defining the open, forward end of the net, the frame being an inverted, hinged U-shaped assembly so the net may be folded for storage.

Stabilizing wings or similar structures are disclosed in U.S. Pat. No. 2,729,910 issued Jan. 10, 1956 to Robert A. Fryklund; U.S. Pat. No. Re. 25,165 issued May 1, 1962 to Orville B. Pulsifer; and U.S. Pat No. 4,082,055 issued Apr. 4, 1978 to Daniel M. Brown.

What is not disclosed by the prior art is a collapsible, wheel supported shrimp trawl which is centrally hinged and capable of being folded and unfolded from the shrimp boat while the trawl is still in the water to thus facilitate loading of the trawl onto the boat after use and unfolding of the trawl in water for a fishing operation, the trawl further having stabilizing wings for keeping the trawl on the sea floor when in use and a separate set of wheels for supporting the forward end of the net lead line.

SUMMARY OF THE INVENTION

Accordingly, it is a principal object of the invention to provide a collapsible, wheel supported shrimp trawl of the beam type which may be folded and unfolded in water from the boat towing the trawl to thus facilitate use of the trawl and its storage aboard the boat when not in use.

It is another object of the invention to provide a collapsible beam trawl having the maneuverability advantages of a beam trawl and the ease of handling and storage advantages of an otter trawl.

It is a further object of the invention to provide a collapsible beam trawl which is wheel supported in use and includes a separate set of wheels for the trawl lead line.

It is yet another object of the invention to provide a collapsible beam trawl which is easy to operate and low in cost of manufacture.

BRIEF DESCRIPTION OF THE DRAWINGS

These and other objects and attendant advantages of the instant invention will become readily apparent by reference to the following detailed specification and drawings in which.

DESCRIPTION OF THE PREFERRED EMBODIMENTS

Figure 1:
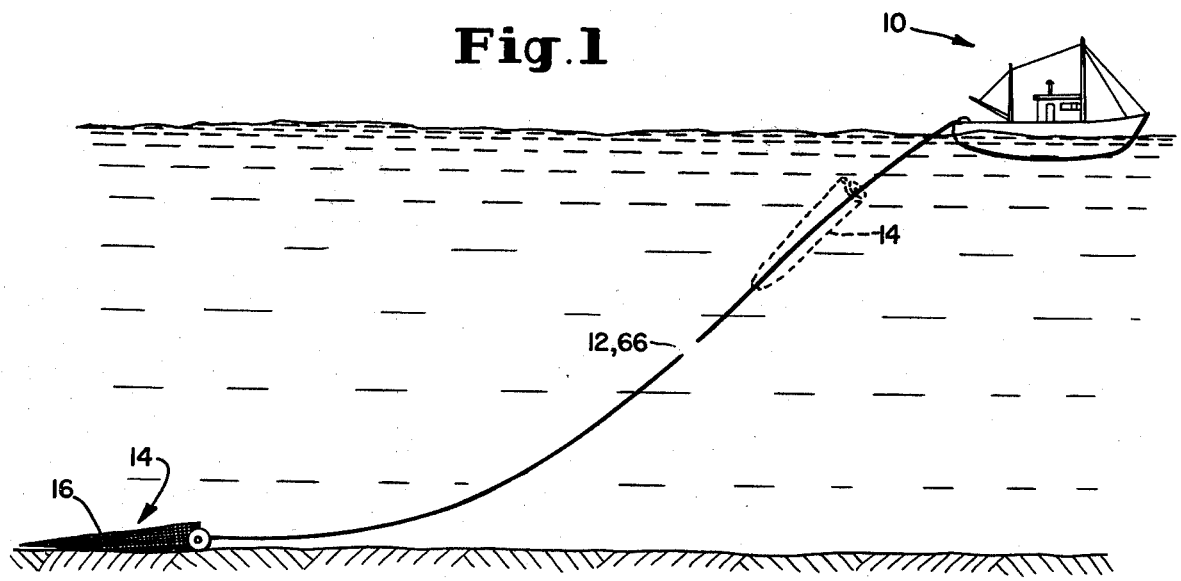
FIG. 1 is an elevation, largely diagrammatic view illustrating the invention in use in the operation of gathering shrimp.

Referring now to the drawings by reference character, a towing vessel or shrimp boat 10 is illustrated in FIG. 1, trailing a towline 12 through a body of water to the beam trawl 14 of this invention, which is moved over the sea floor in an open condition to gather shrimp thereinto in a conventional manner.

Trawl net 16 trails behind the beam trawl assembly, the net 16 being of conventional structure and including a cod end and lazy line operable from the vessel 10 to close the cod end of the net 16 (not shown). At the forward, open end of the net are the usual cork line 18 and lead line 20, the former of course being positively buoyant and the latter being negatively buoyant to maintain the net 16 in an open attitude during the gathering of shrimp.

The beam of the trawl is bifurcated into two, substantially identical box beam sections 22 and 24, connected together by a hinge 26 located at the center, rear of the beam or on a side thereof opposite the direction of tow via towline 12. Thus, hinge 26 is arranged so that the beam may be folded or collapsed in a direction opposite the direction of tow, in a manner to be explained below.

The distal ends of the beam are equipped with wheel and axle assemblies 28, 28, each wheel being of substantial diameter, as shown, with respect to the dimensions of beam sections 22 and 24 in cross-section so as to assure support of the entire beam trawl up off the sea floor over which it is towed.

Further stabilization for the beam trawl as it is towed over the sea floor is provided by a pair of smaller diameter wheels 30, 30 located at the ends of a pair of lead line supports 32, 32, extending angularly, downwardly and rearwardly from the distal ends of beam sections 22, 24, near the wheel and axle assemblies 28, 28. Lead line 20 of net 16 is attached to the outer, free ends of lead line supports 32, 32 by rings 34, 34, as shown.

On the upper sides of the beam sections 22, 24 and at the distal ends thereof are mounted a pair of vertically extended, upright cork line supports 36, 36, each having a U-bolt 38 pivotally secured at the upper end of support 36 for connection of an end of cork line 18. Each support 36 is further provided with a series of bores 40 for selective attachment of U-bolts 38 and cork line 18 to thus vary the heighth of attachment of cork line 18 and thus the heighth of the forward, open end of net 16, as desired.

Figure 2:
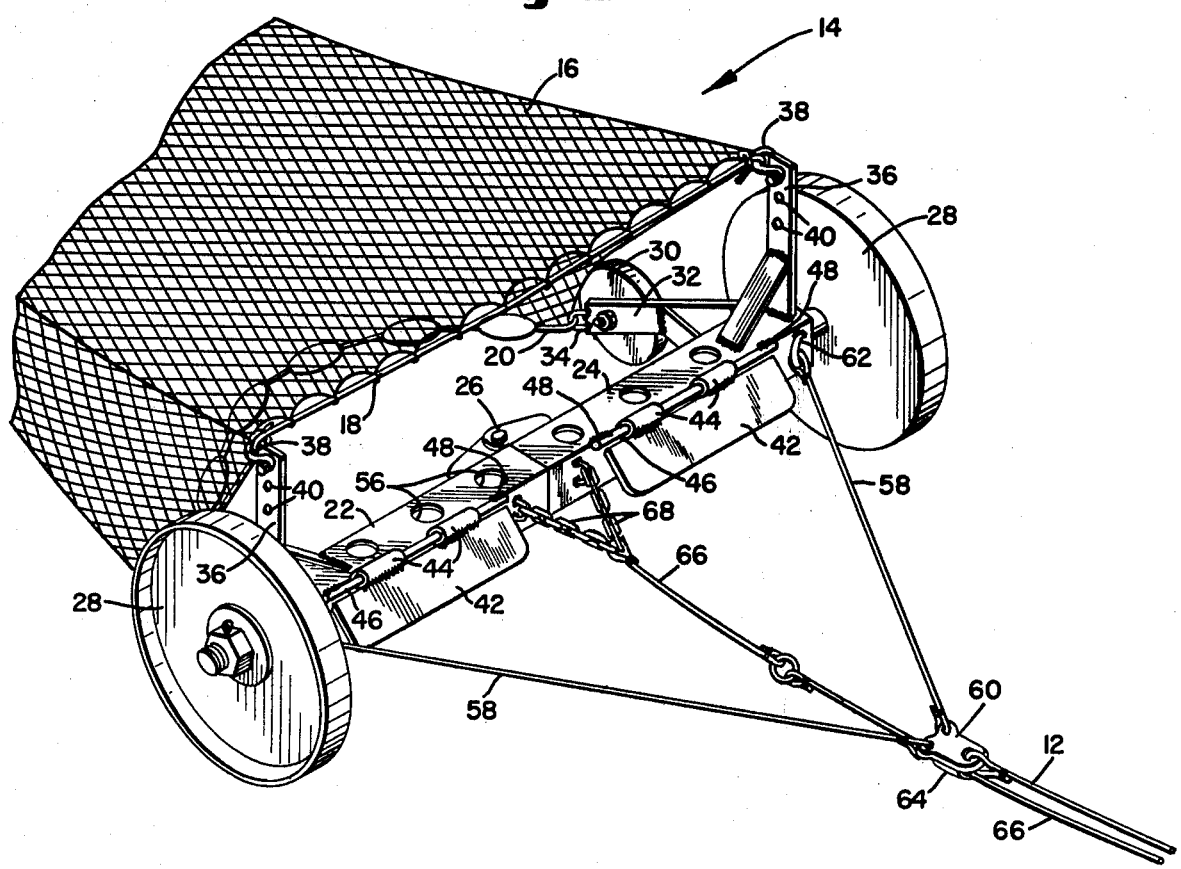
FIG. 2 is a partial perspective view of the forward end of the invention.
Figure 3:
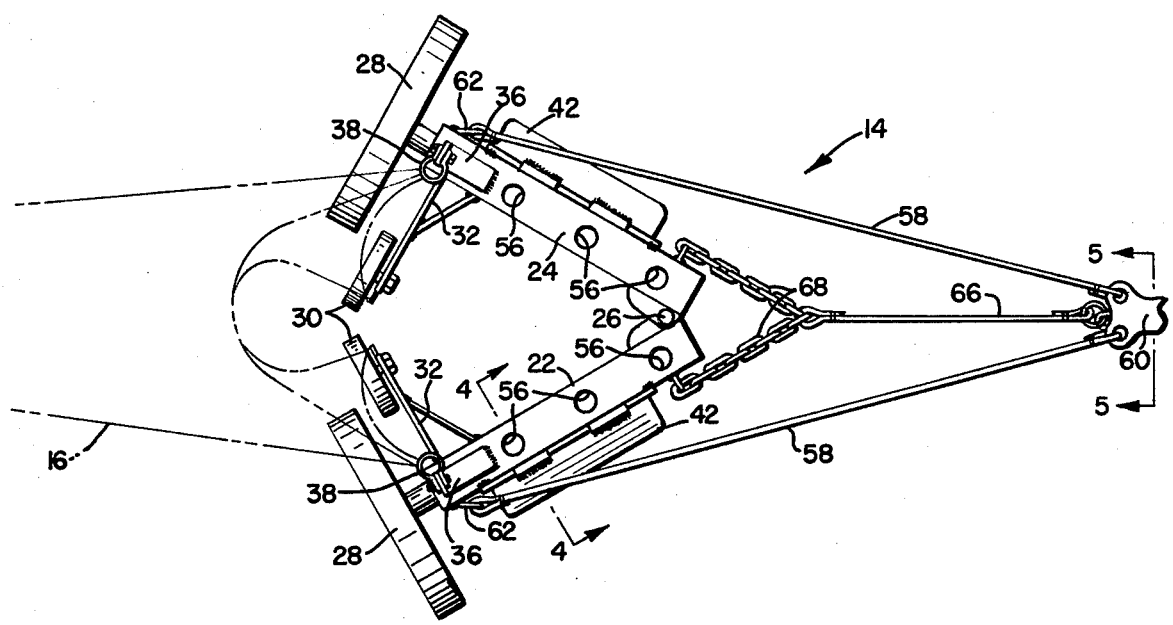
FIG. 3 is a top, plan view of the invention in a collapsed, storage configuration.
Figure 4:
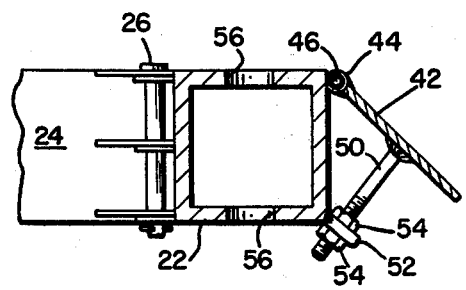
FIG. 4 is a section view taken along lines 4—4 of FIG. 3 and drawn to an enlarged scale.

Referring now to FIGS. 2, 3 and 4, it is seen that each beam section 22, 24 is equipped with a forward, downwardly angled stabilizing wing or plane 42 which are adjustably disposed to assure that the trawl net 14 moves toward and stays on the bottom during towing. Each wing 42 is mounted on its beam section 22 or 24 in semi-piano hinge fashion as indicated at 44, on a piece of bar stock 46, slightly spaced from its beam section and having its outer ends welded to the beam section at 48. As is most clearly seen in FIG. 4, each wing is adjustably disposed by being equipped with a central adjusting rod 50 extended rearwardly through an eye 52 affixed to a forward, lower end of the box beam. The rod 50 is threaded at its outer end to receive a pair of nuts 54, 54, located on either side of eye 52. Of course, the desired angular disposition of wing 42 is then set by simply threading the nuts 54, 54 in one direction or the other.

Also shown in FIGS. 2, 3 and 4 are a plurality of through bores 56 formed in each box beam section 22, 24 to facilitate entry of water into, and drainage of water from, each section as the trawl is lowered in and raised from the water, respectively.

Figure 5:
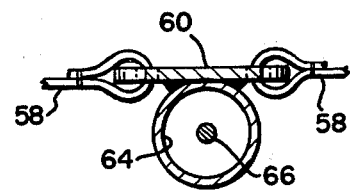
FIG. 5 is another section view taken along lines 5—5 of FIG. 3 and also drawn to an enlarged scale.

Turning now to FIGS. 2, 3 and 5, the towline structure and folding and unfolding operation of the beam trawl will be discussed. Towline 12 is branched into a bridle, including lines 58, 58, at a saddle shackle assembly 60. The free ends of bridle lines 58, 58 are attached to and near the outer distal ends of beam sections 22, 24 at 62, as shown. To the underside of assembly 60 is secured or welded a sleeve guide 64 through which a liveline or tripline 66 is threaded and which is also trailed from vessel 10. Liveline 66 is also bridled into a pair of short length chain sections 68 attached to beam sections 22, 24 near the adjacent forward ends thereof as shown.

The operation of the collapsible beam trawl is a rather uncomplicated matter. As shown in FIG. 3, the trawl may be collapsed or folded about pivot or hinge 26 for easier storage aboard vessel 10. After lowering of the trawl 14 into the water, the beam is opened fully from the disposition shown in FIG. 3 to that illustrated in FIG. 2 by simply slackening liveline 6 while simultaneously exerting a pull on towline 12 and, hence, lines 58 of the towline bridle assembly. This causes a pull on the outer ends of beam sections 22, 24 at 62 causing the sections to pivot about hinge 26 to a net open attitude (FIG. 2).

After shrimping has been completed, trawl 14 may be collapsed or folded by exerting a pull on line 66 while simultaneously allowing slack in towline 12 and, hence, lines 58, 58 of the towline bridle arrangement. This causes a pull on the adjacent, inner ends of the beam sections thereby causing the sections to pivot about hinge 26, from the position shown in FIG. 2 to the collapsed attitude illustrated in FIG. 3.

In the preferred embodiment of the invention, the beam trawl is made of a corrosion resistant metal having a specific gravity considerably in excess of that of water; aluminum, for example, is a suitable metal to be employed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A collapsible beam trawl comprising: a transverse beam, bifurcated into two sections of approximately equal dimensions; hinge means interconnecting said two sections together; and towline means for towing said trawl through the water from a vessel and being operable from said towing vessel for selectively opening and closing said beam trawl by pivoting said beam sections away from and towards each other, respectively, said towline means comprising a towline branched into a bridle, the distal ends of said bridle being attached one to each beam section, and a liveline paralleling said towline and being attached to said beam whereupon pull on one of said towline or liveline and simultaneous slack on the other of said towline or liveline, said beam sections are caused to rotate about said hinge means to thereby effect opening and closing of said beam trawl.

2. The beam trawl as claimed in claim 1, further comprising a trawl net attached to said beam, said trawl net including a cork line and a lead line, and means on said beam for securing said cork line and said lead line to said beam.

3. The beam trawl as claimed in claim 2, said beam further having wheels for supporting said trawl as it is towed across a sea floor, said means on said beam for securing said cork and beam lines comprising a pair of upright supports at the distal ends of said beam to which said cork line is attached and a pair of angularly, rearwardly and downwardly extended projections at said distal ends of said beam to which said lead line is attached, each of said projections including a wheel for support thereof as said trawl is towed across a sea floor.

4. The beam trawl as claimed in claim 3 wherein said upright supports further include means for selective attachment of said corkline therealong whereby the heighth of the opening of said net may be varied.

5. The beam trawl as claimed in claim 1 wherein each of said beam sections further comprise stabilizing wing means on a forward portion thereof, in the direction of tow, for urging said beam towards a sea floor over which the trawl is towed.

6. The beam trawl as claimed in claim 5 wherein each said stabilizing wing means includes hinge means for securing said stabilizing wing means to said beam section and means for selectively, adjustably fixing the angular attitude of a said stabilizing wing means with respect to its beam section.

7. The beam trawl as claimed in claim 1 wherein said beam sections are substantially identical, each beam section being of box beam construction and having means defining a plurality of drain or weep holes therethrough.

8. The beam trawl as claimed in claim 1 wherein said distal ends of the bridle are attached to the distal ends of said beam, there being a saddle shackle at the junction of said bridle and towline, said hinge means being arranged at the rear of said beam with respect to the direction of tow of said beam trawl whereby said beam trawl is collapsible in a direction opposite that of the direction of tow, there being sleeve guide means on said saddle shackle through which said liveline is threaded, and a liveline bridle interconnecting inner, adjacent ends of said beam sections with said liveline whereby during towing and under a pull on said liveline and simultaneous slack in said towline, said beam sections are thereby cause to rotate together, about said hinge means and in a direction opposite that of the direction of tow to thereby collapse said beam trawl and, conversely, upon a pull on said towline and simultaneous slack in said liveline, said beam sections are caused to rotate apart about said hinge means and in the direction of tow to thereby open said beam trawl for a fishing operation.

9. The beam trawl as claimed in claim 1 wherein said beam trawl is made of corrosion resistant materials, said beam sections being made from a material having a specific gravity substantially in excess of the specific gravity of water.

* * * * *